United States Patent [19]
Tanamachi et al.

[11] Patent Number: 5,847,534
[45] Date of Patent: Dec. 8, 1998

[54] CONTROL SYSTEM FOR ELECTRIC VEHICLE

[75] Inventors: Tokunosuke Tanamachi; Kiyoshi Nakamura, both of Hitachinaka, Japan

[73] Assignee: Hitachi, Ltd., Tokyo, Japan

[21] Appl. No.: 696,660

[22] Filed: Aug. 14, 1996

[30] Foreign Application Priority Data

Aug. 18, 1995 [JP] Japan .................................. 7-210426

[51] Int. Cl.$^6$ .................................................. H02P 5/34
[52] U.S. Cl. .................................. 318/201; 318/798-815; 318/52; 318/61; 364/424.07
[58] Field of Search .................................. 318/798–815, 318/52, 61; 364/424.07

[56] References Cited

U.S. PATENT DOCUMENTS

| | | | |
|---|---|---|---|
| 4,335,337 | 6/1982 | Okamatsu et al. | 318/52 |
| 5,481,460 | 1/1996 | Masaki et al. | 364/424.07 |
| 5,583,406 | 12/1996 | Mutoh et al. | 318/376 |

FOREIGN PATENT DOCUMENTS

| | | |
|---|---|---|
| A-0085394 | 1/1983 | European Pat. Off. |
| A-0521162 | 1/1992 | European Pat. Off. |
| A-0594130 | 10/1993 | European Pat. Off. |
| A-0699553 | 8/1995 | European Pat. Off. |

OTHER PUBLICATIONS

"Slip/Skid Control in an Inverter Controlled Vehicle", Proceedings of the Na'l Meeting of Industry and Application Society, Institute of electrical Engineers of Japan, Aug. 1990, front page, pp. 25–30.

"A Novel High Adhesion Control Method in a VVVF Inverter Control", Science of Electric Car, Feb. 1992, vol. 45, No. 2, front page, pp. 13–17.

*Primary Examiner*—Karen Masih
*Attorney, Agent, or Firm*—Antonelli, Terry, Stout & Kruas, LLP

[57] ABSTRACT

The control system is constructed so that an inverter output frequency command is increased/decreased based on a frequency-to-time rate-of-change command, and the frequency-to-time rate-of-change command is controlled with a current control system. Further, it is also constructed so that the frequency-to-time rate-of-change command is adjusted and the current command is changed with a readhesion control system. The control system is capable of accelerating and decelerating the vehicle with a torque corresponding to an inverter output current command which is generated basically without using any rotational frequency of induction motor, and further capable of accelerating and decelerating the vehicle with a torque corresponding to a value near the limit adhesion between the wheel and the rail under a condition of occurrence of slip/skid.

13 Claims, 12 Drawing Sheets

IN CASE OF $(dTm/d\Delta F) > (dT\mu/d\Delta F)$

IN CASE OF $(dTm/d\Delta F) < (dT\mu/d\Delta F)$

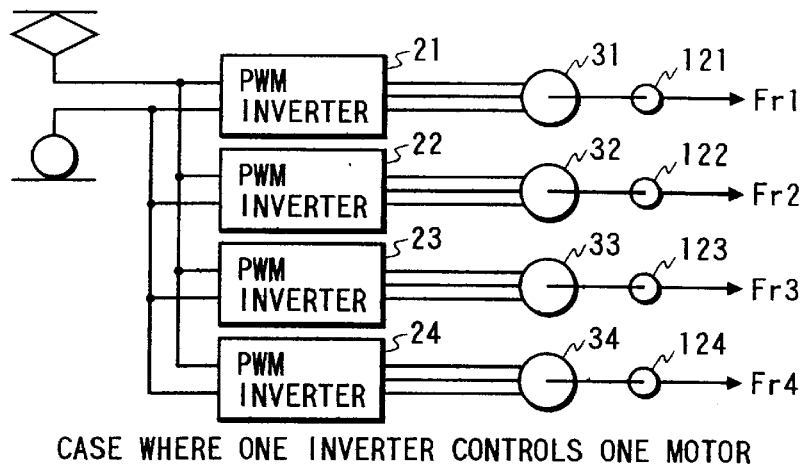
CASE WHERE ONE INVERTER CONTROLS ONE MOTOR
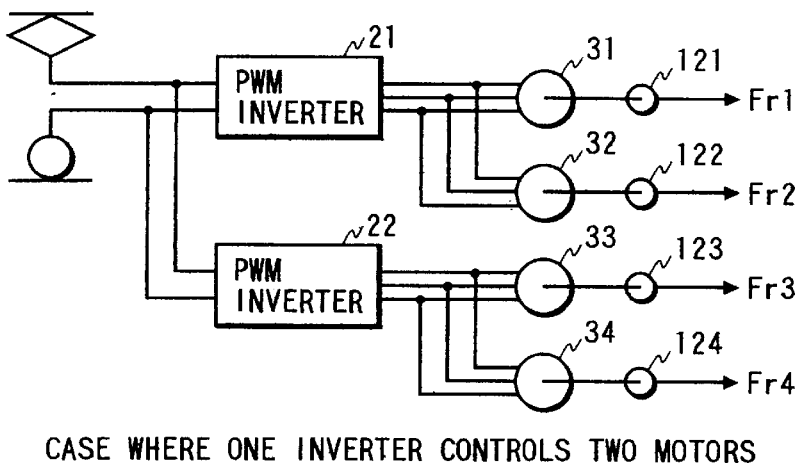
CASE WHERE ONE INVERTER CONTROLS TWO MOTORS
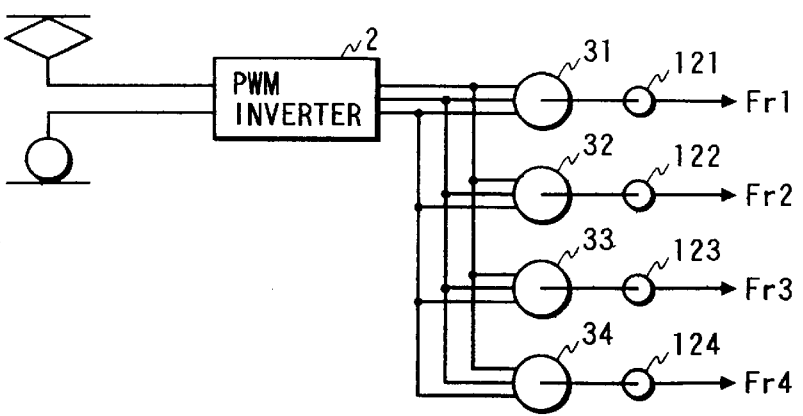
CASE WHERE ONE INVERTER CONTROLS FOUR MOTORS

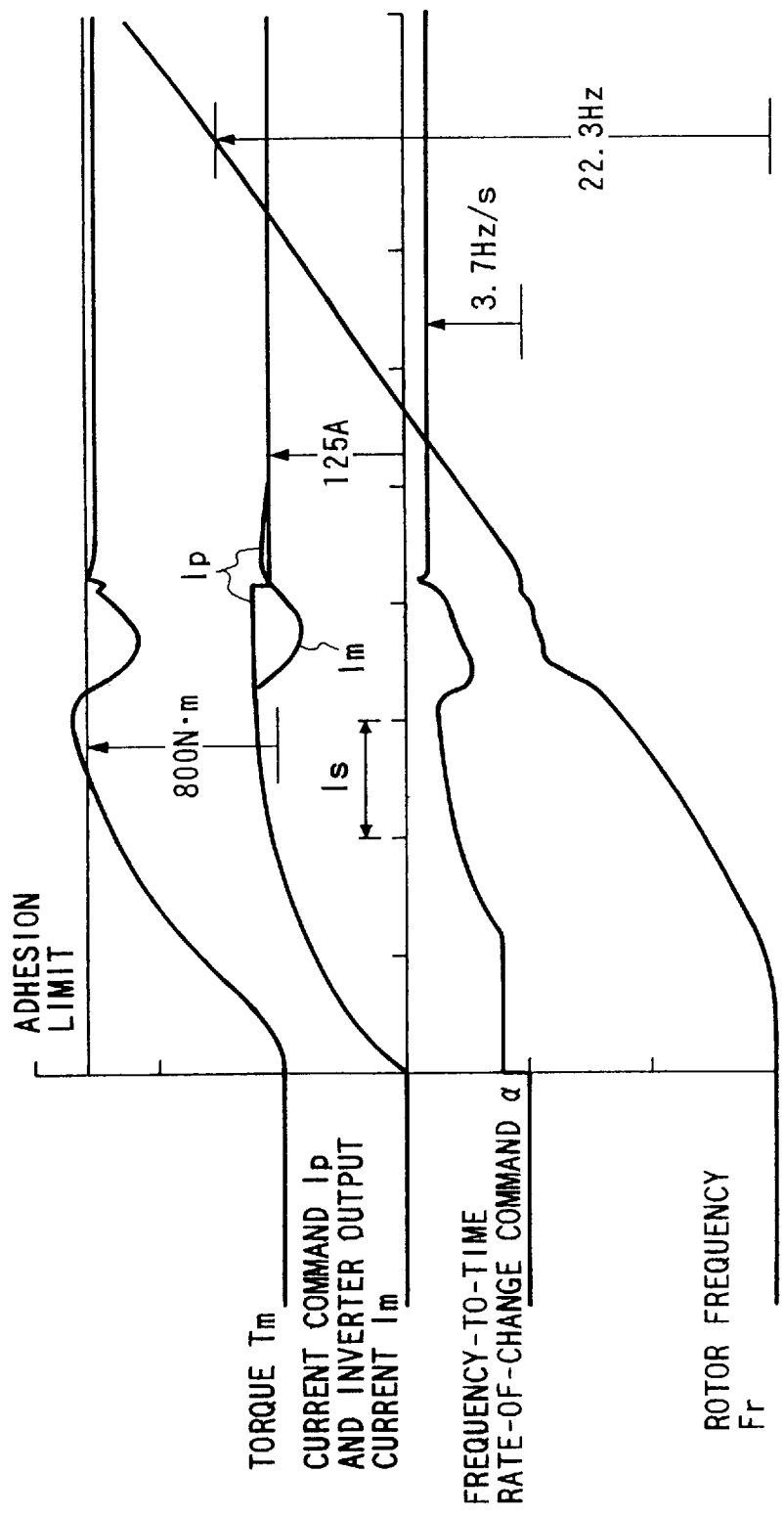

CONTROL SYSTEM FOR ELECTRIC VEHICLE

BACKGROUND OF THE INVENTION

The present invention relates to a control system for an electric vehicle, and more particularly to a control system for an electric vehicle having an induction motor using an inverter, such as an electric train or an electric car.

In an inverter-controlled electric vehicle, as is well-known, an output frequency command for controlling an inverter is determined by adding or subtracting a slip frequency command to or from the rotational frequency of an induction motor. And, the output voltage of the inverter is controlled in proportion to the inverter frequency command so that the ratio V/F of the voltage V to the frequency F remains constant, and further the current of the motor is generally controlled so as to be kept constant by a slip frequency control.

When a slip/skid occurs, the constant current control system operates to suppress the slip frequency, that is, the current of the motor is decreased by increasing and decreasing the rotational frequency of the motor. Therefore, the torque is not decreased, and consequently the slip/skid is amplified to cause a large slip/skid.

A readhesion control method for a slip/skid is described in an article entitled "Slip/Skid Control in an Inverter Controlled Vehicle" (the Proceedings of the National Meeting of Industry and application Society, the Institute of Electrical Engineers of Japan (1990)) (hereinafter, referred to as "Reference (1)"), wherein, when detecting a slip/skid, a controller controls the slip frequency or a current command in accordance with a predetermined pattern.

Further, to achieve constant current control, a method of frequency changing rate control is proposed in an article entitled "A Novel High Adhesion Control Method in a VVVF Inverter Control" (Science of Electric Car, February, 1992) (hereinafter, referred to as Reference (2)).

In this method, an inverter output frequency command is determined by integrating a frequency changing rate (acceleration) pattern. As the result, although self-readhesion can be expected even when slipping occurs, it is shown that readhesion can be more easily attained by detecting the slip and changing the frequency changing rate.

In the inverter control method where the inverter output frequency command depends on the rotating frequency of the induction motor (because the inverter frequency command is determined from a rotating frequency and a slip frequency) and constant current control is executed even when the vehicle is in a slip/skid, as described above, the slip/skid is apt to be amplified to cause a large slip/skid when the slip/skid occurs. Further, the inverter output frequency control always requires detection of the rotational frequency of the induction motor.

In the readhesion control method described in Reference (1) where the slip frequency or the current command is controlled using a given pattern when the slip/skid is detected, it is difficult to increase the average torque of the induction motor up to a value near the adhesion limit between the wheel and the rail. This is because the torque of the induction motor is determined by the control pattern of the slip frequency or the current command and the detecting level of the slip/skid is set high enough to avoid a detection error of the slip/skid.

On the other hand, in the inverter control method described in Reference (2), since there is no constant current control system, such as employed in the control system Reference (1), though the rotational frequency is not used for control, an over-current state is apt to occur, and, accordingly, the method is unrealistic, though there is a description in the reference that the frequency changing rate is variably controlled with an upper limit and a lower limit in order to cope with a change in the slope of the rail-way or in the weight of the electric car (electric vehicle).

SUMMARY OF THE INVENTION

An object of the present invention is to provide a control system for an electric vehicle which is capable of effecting accelerating (power running) and decelerating (regenerative running) control of the vehicle with a torque corresponding to an inverter output current command which is generated basically without any use of the rotational frequency of the induction motor, and which is further capable of effecting accelerating and decelerating control of the vehicle with a torque corresponding to a value near the limit of adhesion between the wheel and the rail in the event of occurrence of a slip/skid.

The object of the present invention can be attained by providing a control system, for an electric vehicle, which has an induction motor for driving the vehicle, an inverter for driving the induction motor, a generator for providing a current command for controlling a current output from the inverter, an arrangement for detecting the output current of the inverter, an arrangement for generating a reference frequency-to-time rate-of-change command corresponding to an acceleration/deceleration of the vehicle, an arrangement for detecting the quantity of a slip/skid of a wheel driven by the induction motor, an arrangement for generating a frequency-to-time rate-of-change command by adjusting the reference frequency-to-time rate-of-change command, an arrangement for generating an output frequency command of the inverter based on the frequency-to-time rate-of-change command, and a readhesion arrangement for changing the current command from the inverter.

According to the present invention, during a normal period in which a slip/skid does not occur, the time-to-change rate command of the output frequency of the inverter is controlled so that output current of the inverter agrees with a current command.

The inverter output frequency command increases when the vehicle is powered-running and decreases when the vehicle is regenerative-running based on the frequency-to-time rate-of-change command. Therefore, the rotational frequency of the induction motor is not essentially required for generating the inverter output frequency command.

Further, since the frequency-to-time rate-of-change command corresponds to the current command, the vehicle is accelerated (power running) or decelerated (regenerative running) by a torque corresponding to the current command.

In the event of the occurrence of a slip/skid, the slip/skid is suppressed since the frequency-to-time rate-of-change command is adjusted corresponding to the quantity of the slip/skid.

Further, since the current command is changed based on the inverter output current at the moment after a necessary time period in which the slip/skid occurs and the condition of the slip/skid reaches a value near the adhesion limit between the wheel and the rail, the slip/skid is stopped, that is, readhesion occurs, and the vehicle is accelerated/decelerated with a torque in a condition near the adhesion limit.

BRIEF DESCRIPTION OF DRAWINGS

FIG. 6A is a block diagram showing the driving arrangement for a vehicle, in a case where a respective inverter controls a each induction motor;

FIG. 6B is a block diagram showing the driving arrangement for a vehicle, in a case where each inverter controls two induction motors;

FIG. 6C is a block diagram showing the driving arrangement for a vehicle, in a case where one inverter controls four induction motors;

FIG. 8B-1 and FIG. 8B-2 are block diagrams showing another construction of the slip/skid quantity detector;

FIG. 8C-1 and FIG. 8C-2 are block diagrams showing a further construction of the slip/skid quantity detector;

FIG. 9 is a graph showing an example of a simulation result of the readhesion control of FIG. 3;

DESCRIPTION OF THE INVENTION

Figure 1:
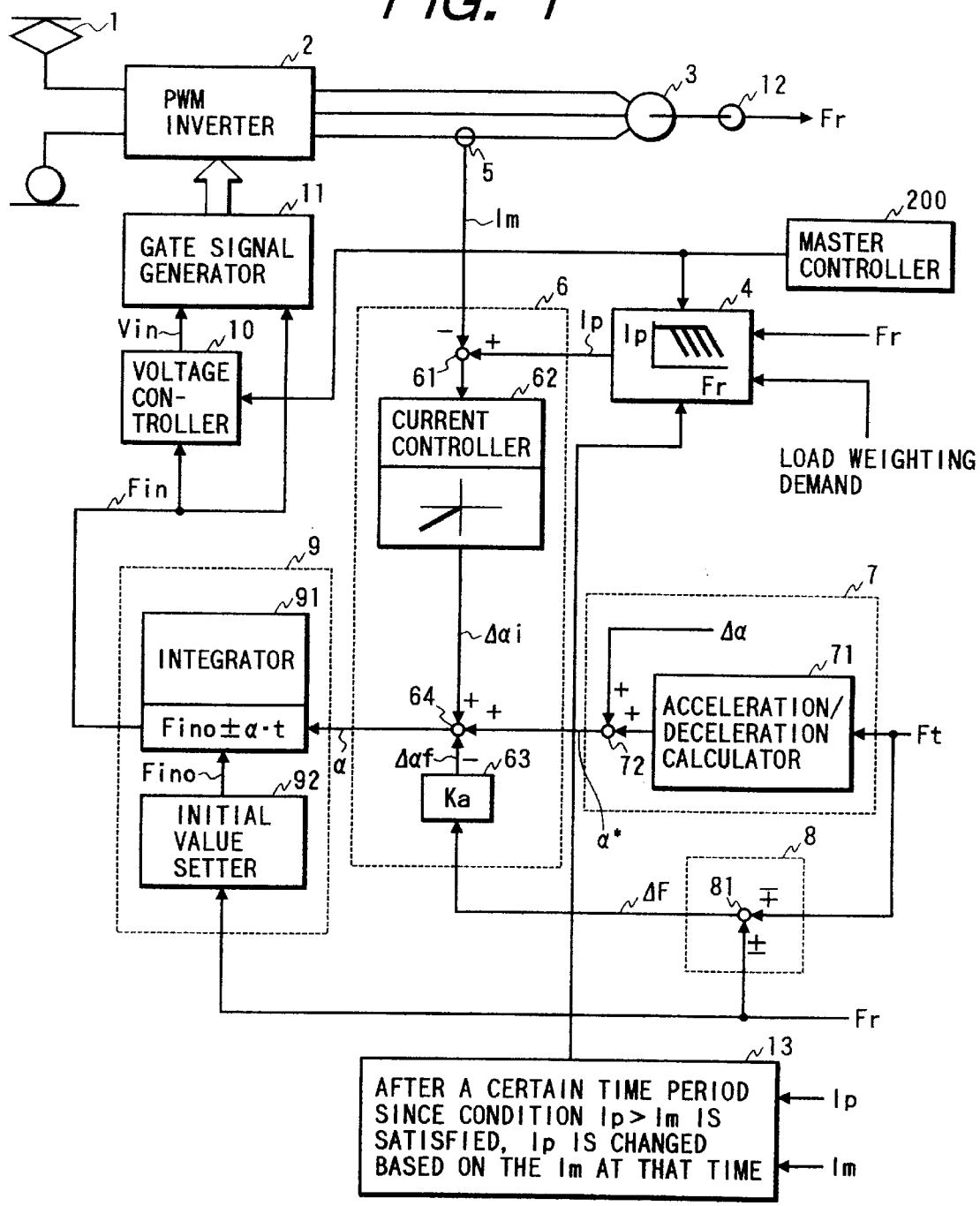
FIG. 1 is a block diagram showing the circuit construction of a first embodiment in accordance with the present invention.

FIG. 1 is a block diagram showing the circuit construction of a first embodiment in accordance with the present invention. A pantograph 1 receives a direct current from an overhead wire and supplies to direct current to a PWM (pulse width modulating) inverter 2 for converting the direct current to a three-phase alternating current, which is applied to an induction motor 3 for driving a vehicle to be driven by the inverter 2.

The control system for the inverter 2 includes a means 4 for generating a current command Ip for an output current of the inverter 2, a means 5 for detecting an output current Im of the inverter 2, a means 12 for detecting the rotating speed Fr of the induction motor 3, and a master controller 200.

The master controller 200 outputs a notch command produced from a handle operated by an operator of the vehicle, and the notch command is supplied to the current command generator 4 and to a voltage controller 10. The current command generator 4 receives the notch command, a signal representative of the rotational frequency Fr of the induction motor 3 and a load signal from a load compensating device (not shown in the figure) and outputs a current command Ip corresponding to the rotational frequency Fr of the induction motor 3 and the notch command.

The notch command specifies a maximum speed in the case of an electric car and specifies a current value itself (which becomes a torque command) in the case of an electric locomotive (a railway electric rolling stock) 3. Since this embodiment deals with an electric car, a curve of the rotational speed Fr of the induction motor specifying the maximum speed versus the current command Ip is shown in FIG. 1.

The load compensating device which supplies the load signal is a device for detecting the weight of passengers in the electric car, and the current command Ip is adjusted so as to be increased for a full load and to be decreased for an empty load corresponding to an output of the load responding unit so as to always obtain a nearly constant tension.

The output of the current command generator 4 is applied to a means 6 for generating a command α representing an output frequency-to-time rate-of-change (output frequency change to time change relationship) of the inverter 2. Hereinafter, the time-to-change rate of the output frequency of the inverter 2 is referred to as a frequency-to-time rate-of-change.

The control system further includes a means 7 for generating a reference frequency-to-time rate-of-change command α* by calculating a frequency-to-time rate-of-change equivalent to an acceleration/deceleration of the vehicle, using an acceleration calculator 71, from a rotational frequency Ft which is obtained by converting the vehicle speed. That is, the rotational frequency of a non-driven wheel (not shown in the figure) detected by a detector attached to a wheel shaft of a trailer is converted to a rotational frequency equivalent to that of the induction motor 3, and a given value Δα is added to the obtained frequency-to-time rate-of-change using an adder 72.

Since the acceleration calculator 71 is a differential element, it is preferable to provide the means 7 with a mean value processor (smoothing means) in order to remove vibrating components which are produced in the rotational frequency due to joint points of the rail and the like.

The control system also includes a means 8 for detecting a rotational frequency difference ΔF between the rotating frequency Ft of the non-driven wheel and the rotational frequency Fr of the induction motor 3 by subtracting Ft from Fr during power running using a subtracter 81 and by subtracting Fr from Ft during regenerative running using the subtracter 81.

The frequency-to-time rate-of-change command means 6 subtracts the detected value of the inverter output current Im from the current command Ip using a subtracter 61 and inputs the difference to a current controller 62. When the inverter output current Im becomes larger than the current command Ip, the current controller 62 outputs a negative signal Δαi corresponding to the current difference, and when the inverter output current Im becomes smaller than the current command Ip, the current controller 62 puts the signal Δαi to 0 (zero).

Further, the frequency-to-time rate-of-change command means 6 outputs a frequency-to-time rate-of-change command a (=α*+Δαi−Δαf) by adding the output Δαi of the current controller 62 to and subtracting Δαf, which is obtained by multiplying the output ΔF of the slip/skid quantity detector by Ka using a multiplier 63, from the output α* of the reference frequency-to-time rate-of-change generator 7.

In the electric vehicle, an acceleration is generally determined when the vehicle runs on a flat railway, and a torque is set based on the capability of running with the acceleration. The capacities, that is, the current value to be used and so on of the inverter and the induction motor are determined based on the torque. The inverter 2 is composed of a plurality of self-arc-extinguishing type semiconductor elements which are not shown in the figure.

Since the control elements of the inverter supply a large current to the induction motor, there is a possibility that damage to the elements will result if an over-current occurs. Therefore, the inverter must be controlled according to its capacity. In other words, since the output current of the inverter (motor current) is required to be controlled, a current control system is provided in this embodiment.

Since the system in the ΔForementioned Reference (2) is of an open-loop type for the current and does not control the current, there is a possibility that damage of the control elements of the inverter will occur, and accordingly the system is not practical use as a control system for an electric vehicle.

The output of the command means 6 is supplied to a means 9 for generating an output frequency command Fin for the inverter 2. In the means 9, an initial value Fino of the inverter output frequency command Fin is set based on the rotational frequency of the induction motor 3 using an initial value setter 92.

The means 9 is provided for use in the event of re-power running and regenerative run braking of the electric vehicle in order to smoothly perform re-power running and regenerative run braking from the state of the vehicle speed (a rotational frequency of the induction motor 3) at the moment.

If the means 9 is not provided, the vehicle will be subjected to the effects of an unexpected acceleration or deceleration. Thus, using an integration calculator 91, an integrated value of the frequency-to-time rate-of-change command α is added to or subtracted from the initial value Fino (addition at power running and subtraction at regenerative running) to output an inverter output frequency command Fin.

The inverter output frequency command Fin is supplied to a voltage controller 10 for performing variable voltage variable frequency control (for a VVVF control region) where the output voltage of the inverter 2 is nearly proportional to the inverter output frequency command Fin and for performing constant voltage variable frequency control (for CWF control region) where the output voltage of the inverter 2 is fixed to a nearly constant value.

Further, the voltage controller performs so-called notch-stopping where the obtained voltage command is limited by a notch command of the master controller 200. Although the current command generator 4 outputs a current command for a maximum speed corresponding to a notch command, the notch-stopping is provided for accelerating the effect.

The output Vin of the voltage controller 10 is supplied to a means 11 for generating a gate signal to input to switching elements (not shown) within the inverter 2, so that the inverter 2 may perform the necessary voltage conversion operation, the gate signal being generated in response to the inverter output frequency command Fin and the voltage command Vin from the voltage controller 10.

The control system additionally has a readhesion means 13. When the inverter output current Im and the current command Ip are compared to each other, and if the time period of a state in which the inverter output current Im is smaller than the current command Ip exceeds a given length, the readhesion means changes the current command Ip of the current command generator 4 based on the inverter output current Im at that time.

Herein, the time period of a state in which the inverter output current Im is smaller than the current command Ip may be determined from the time period during which the output Δαi of the current controller 62 is 0 (zero), instead of comparing the inverter output current Im and the current command Ip.

The basic operation of the embodiment of FIG. 1 in a normal condition where a slip/skid does not occur now will be described.

In FIG. 1, in a case where the inverter output current Im is smaller than the current command Ip, the output Δαi of the current controller 62 is 0 (zero), and the frequency-to-time rate-of-change command a becomes equal to the reference frequency-to-time rate-of-change command α* which is obtained by adding the given value Δα to the frequency-to-time rate-of-change equivalent to the acceleration/deceleration of the vehicle (time-to-change rate of rotational frequency of the induction motor 3).

Therefore, the slip frequency of the induction motor 3 is increased by the given value Δα and the motor current, that is, the inverter output current Im is increased so as to approach the current command Ip. Then, when the inverter output current Im becomes larger than the current command Ip, the current controller 62 generates an output Δαi (negative value).

Thus, the predetermined value Δα is compensated by the output Δαi of the current controller 62, and the frequency-to-time rate-of-change command α becomes equal to the frequency-to-time rate-of-change equivalent to the acceleration/deceleration of the vehicle. In other words, an increase (in power running)/decrease (in regenerative running) of the inverter output frequency command Fin, based on the frequency-to-time rate-of-change command a, is equal to an increase/decrease of the rotational frequency Fr of the induction motor 3, that is, the slip frequency becomes constant and the inverter output current Im becomes slightly larger than the current command Ip by the amount of Δαi.

Therefore, the frequency-to-time rate-of-change command a corresponds to the current command Ip (≈inverter output current Im), and the vehicle is accelerated (power running)/decelerated (regenerative running) with a torque equivalent to the current command Ip.

The basic operation in a condition where slip occurs when the vehicle is powered-running, in an acceleration mode, now will be described with reference to FIG. 2A and FIG. 2B.

Figure 2A:
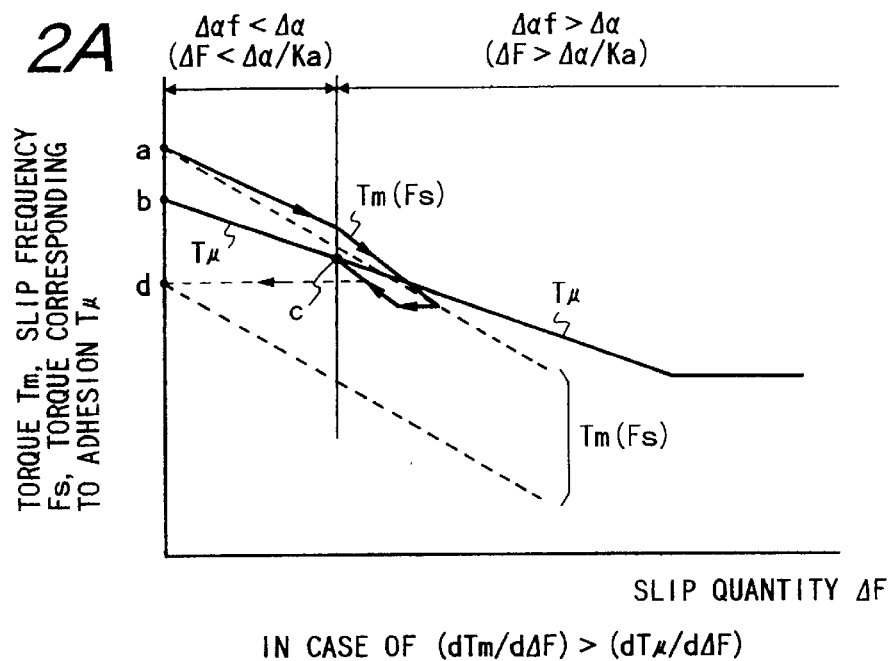
FIG. 2A is a graph illustrating the basic operation of the system of FIG. 1 during a slip in a case where the change of Tm against the change of ΔF (dotted line of dTm/dΔF) is larger than the change of Tμ against the change of ΔF (solid line of dTμ/dΔF.
Figure 2B:
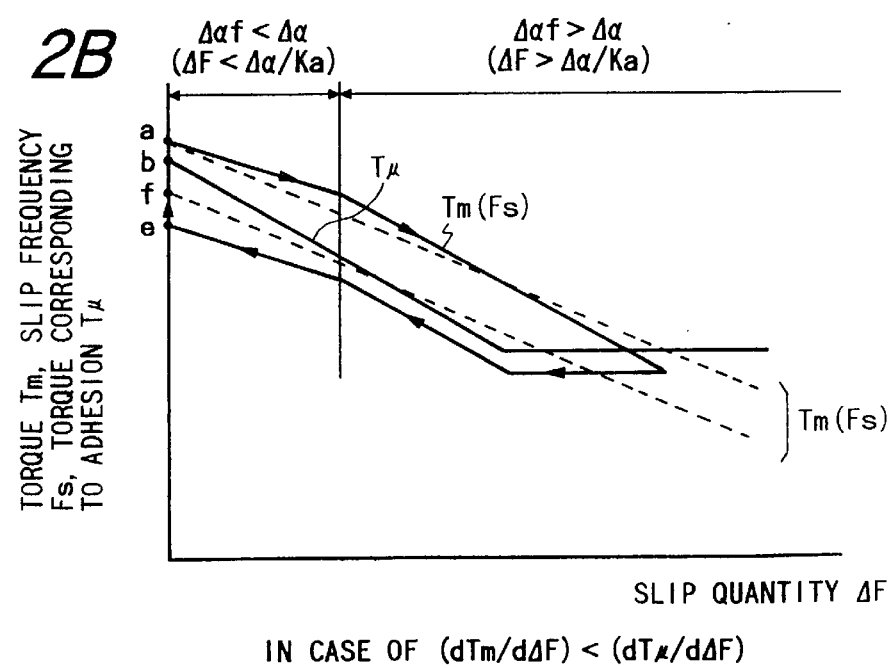
FIG. 2B is a graph illustrating the basic operation of the system of FIG. 1 during a slip in a case where the dotted line of dTm/dΔF is smaller than the solid line of dTμ/dΔF.

FIG. 2A and FIG. 2B are graphs which illustrate torque Tm of the induction motor 3 (slip frequency Fs), and torque T$\mu$ equivalent to an adhesion force between the rail and the wheel versus slip quantity ΔF (rotational frequency difference between rotational frequency Fr and rotational frequency of the non-driven wheel Ft (speed of the vehicle)).

FIG. 2A shows a case where the change of Tm against the change of ΔF (dotted line of dTm/dΔF) is larger than the change of T$\mu$ against the change of ΔF (solid line of dT$\mu$/dΔF), and FIG. 2B shows a case where the dotted line of dTm/dΔF is smaller than the solid line of dT$\mu$/dΔF.

In FIG. 1, when the torque T$\mu$ equivalent to the adhesion limit between the rail and the wheel decreases, as shown in FIG. 2A or FIG. 2B, the point b becomes smaller than the torque Tm of the induction motor 3 shown by the point a, and the induction motor 3 initiates a slip.

When the induction motor initiates a slip, the increase of the rotational frequency Fr becomes larger than the increase of the inverter output frequency command Fin and the slip frequency, that is, the inverter output current (motor current) Im becomes smaller than the current command Ip, and consequently the output $\Delta\alpha i$ of the current controller 62 becomes 0 (zero).

Then, the reference frequency-to-time rate-of-change command $\alpha^*$, which is obtained by adding the predetermined value $\Delta\alpha$ to the frequency-to-time rate-of-change equivalent to the acceleration of the vehicle, is adjusted by $\Delta\alpha f$, which is obtained by multiplying the slip quantity $\Delta F$ by Ka, and then the frequency-to-time rate-of-change command $\alpha$ can be obtained.

In FIG. 2A, in a condition where $\Delta\alpha f$, that is, Ka times of the slip amount $\Delta F$<the given value $\Delta\alpha$ to be added to the frequency-to-time rate-of-change of the vehicle ($\Delta F<\Delta\alpha/$ Ka), the frequency-to-time rate-of-change command $\alpha$>the frequency-to-time rate-of-change equivalent to the acceleration of the vehicle.

The slip frequency Fs is increased by $(\Delta\alpha-\Delta\alpha f)$ (the dotted line of torque Tm (Fs) line is directed upward) and decreased by $\Delta F$. In the result, the slip frequency Fs is decreased and consequently Tm is decreased as shown by the solid arrow.

Herein, the force to increase the slip $(Tm-T\mu)$ is decreased as $\Delta F$ increases since the change of Tm against the change of $\Delta F$ (the dotted line of $dTm/d\Delta F$)>the change of the torque $T\mu$ equivalent to the adhesion force between the rail and the wheel against the change of $\Delta F$ (the soil line of $dT\mu/d\Delta F$).

When $\Delta F$ is increased and the condition $\Delta\alpha f>\Delta\alpha(\Delta F>\Delta\alpha/$ Ka) is attained, the condition of the frequency-to-time rate-of-change command $\alpha$<the frequency-to-time rate-of-change equivalent to the acceleration of the vehicle is satisfied, and the slip frequency Fs is decreased by $\Delta\alpha f-\Delta\alpha$ (the dotted line of Tm (Ts) line is directed downward) and deceased by $\Delta F$.

As a result, the slip frequency Fs is decreased and Tm is decreased as shown by the solid arrow. Then, the condition of $Tm<T\mu$ is attained and $\Delta F$ turns from increasing to decreasing Fs, that is, Tm is turned from decreasing to increasing due to a decrease in $\Delta F$ as shown by the solid arrow.

Although there is an action to satisfy the condition $\Delta\alpha f<\Delta\alpha(\Delta F<\Delta\alpha/Ka)$ again because the dotted line of dTm /D$\Delta F$>the solid line of $dT\mu/d\Delta F$, the slip is brought at the point c into a balancing state where the condition $Tm=T\mu$, that is, $\Delta\alpha f=\Delta\alpha$ (the frequency-to-time rate-of-change command $\alpha$=the frequency-to-time rate-of change equivalent to the acceleration of the vehicle) is satisfied.

Therefore, after a certain time period from the time when slipping occurs, that is, the condition of the current command Ip>the inverter output current (motor current) Im occurs, to the time when the operation point is settled near the point c, Ip is changed to Ip' having a value smaller than the value of Ip at that time.

Although the condition becomes Ip'<Im as a result, the frequency-to-time rate-of-change command $\alpha$ is controlled by the current controller 62 so as to become Im$\approx$Ip', as described above, and Tm (Fs) is moved as shown by the dotted line arrow, that is, $\Delta F$ is decreased while the condition of $Tm<T\mu$ is being maintained and Tm is settled at the point d to result in readhesion.

Therein, $\Delta F$ at the point c becomes smaller as Ka becomes larger, and the inverter output current (motor current) Im, that is, the torque Tm approaches closer to a value equivalent to the adhesion limit (point b). Therefore, by setting the given time period for changing the current command Ip properly, the vehicle can be accelerated with a torque equivalent to the current command Ip' corresponding to a value near the adhesion limit.

In FIG. 2B, in a condition where $\Delta\alpha f$, that is, Ka times the slip amount $\Delta F$<the given value $\Delta\alpha$ to be added to the frequency-to-time rate-of-change of the vehicle ($\Delta F<\Delta\alpha/$ Ka), as in FIG. 2A, the torque Tm (slip frequency Fs) is decreased as shown by the solid arrow.

Herein, the force to increase the slip $(Tm-T\mu)$ is increased as $\Delta F$ increases since the change of Tm against the change of $\Delta F$ (the dotted line of $dTm/d\Delta F$)<the change of the torque $T\mu$ equivalent to the adhesion force between the rail and the wheel against the change of $\Delta F$ (the solid line of $dT\mu/d\Delta F$). When $\Delta F$ is increased and the condition $\Delta\alpha f>\Delta\alpha(\Delta F>\Delta\alpha/$ Ka) is attained, Tm (Fs) is decreased up to the region where the dotted line of $dTm/d\Delta F$>the solid line of $dT\mu/d\Delta F$, as shown by the solid arrow, which is the same as in FIG. 2A.

Then, the condition of $Tm<T\mu$ is attained and $\Delta F$ turns from increasing to decreasing Fs, that is, Tm is turned from decreasing to increasing due to a decrease in $\Delta F$ as shown by the solid arrow.

Although the condition $\Delta\alpha F<\Delta\alpha(\Delta F<\Delta\alpha/Ka)$ takes place again, because the dotted line of $dTm/D\Delta F$>the solid line of $dT\mu/d\Delta F$, Tm reaches the point e while the condition $Tm<T\mu$ is being maintained to cause readhesion, and Fs, that is, Tm is increased so as to be directed to the point a by the given value to be added to the frequency-to-time rate-of-change equivalent to the acceleration of the vehicle.

Therein, after a certain time period from the time when slipping occurs, that is, the condition wherein the current command Ip>the inverter output current (motor current) Im occurs, to the time when Fs, that is, Tm reaches a point between the point e and the point a, that is, the point f smaller than the point b, Ip is changed to Ip' having a value smaller than the value of Ip at that time.

Although the condition becomes Ip'<Im as a result, the frequency-to-time rate-of-change command a is controlled by the current controller 62 so as to become Im$\approx$Ip', as described above.

Therefore, by setting the given time period for changing the current command Ip properly, the inverter output current (motor current) Im, that is, the torque Tm, approaches closer to a value equivalent to the adhesion limit (point b), and accordingly the vehicle can be accelerated with a torque equivalent to the current command Ip' corresponding to a value near the adhesion limit.

In considering a case where the torque $T\mu$ at the point b equivalent to the adhesion force between the rail and the wheel recovers to a value above the torque Tm at the point a of the induction motor 3 in FIG. 2A and FIG. 2B, it is necessary for the readhesion means 13 to operate to moderately return the current command after it has changed to Ip' to the current command Ip when the time period in which the inverter output current (motor current) Im exceeds the current command after it was changed to Ip' becomes larger than the given time period.

The basic operation described above is the same in a case of a skid when the vehicle is regenerative-running and in a deceleration mode.

As stated above, according to the present embodiment, since the inverter output frequency command is generated based on the frequency-to-time rate-of-change command, the rotational frequency is basically unnecessary as a factor in generating the inverter output frequency command.

In a normal condition where a slip/skid does not occur, since the frequency-to-time rate-of-change command is controlled so that the inverter output current becomes equal to the current command, there is an effect in that over-current hardly occurs and the vehicle is accelerated/decelerated with a torque equivalent to the current command.

Further, under a condition where a slip/skid occurs, the frequency-to-time rate-of-change command is adjusted corresponding to the quantity of the slip/skid to suppress the slip/skid.

Furthermore, after a given time period from the time when the slip/skid occurs to the time when the slip/skid is brought to a condition near the adhesion limit, since the current command is changed based on the inverter output current at that time, there is an effect in that the vehicle is accelerated/decelerated with a torque equivalent to a value near the adhesion limit.

In addition to the above effects, according to this embodiment, even when an error occurs in an output $\Delta F$ of the slip/skid quantity detector 8 during normal running in which a slip/skid does not occur, there is no problem of an error component exceeding the given value $\Delta\alpha$ which is to be added to the frequency-to-time rate-of-change equivalent to the acceleration/deceleration of the vehicle.

Further, even if the error component exceeds the given value $\Delta\alpha$, there is an effect that the effect of change in the slip frequency (changes in the current and the torque) is small due to its being temporary, since the integrated value of the difference between the error component and the given value $\Delta\alpha$ is the change in the slip frequency.

In the embodiment shown in FIG. 1, in order to eliminate the effect of a steady-state error in the output $\Delta F$ of the slip/skid quantity detector 8, a means for correcting the steady-state error in $\Delta F$ may be provided.

Such a means periodically checks $\Delta F$ to correct the error in the output $\Delta F$ during a normal period where the slip/skid does not occur, that is, in a condition of the current command Ip<the inverter output current Im (under condition of $\Delta F=0$).

In a case of constant speed running, by providing a means for setting the frequency-to-time rate-of-change command $\alpha$ to 0 (zero) by a constant speed running command, the speed at the time when the command is output is basically maintained.

Further, the inverter output frequency command generating means 9 requires a means for limiting the slip frequency of the induction motor 3 so as to not exceed the given value Fsm, that is, for limiting the inverter output frequency command Fin so as to not become larger than the frequency which is obtained by adding Fsm to a rotational frequency when the vehicle is powered-running and for limiting the inverter output frequency command Fin so as to not become smaller than the frequency which is obtained by subtracting Fsm from a rotational frequency when the vehicle is regenerative-running.

Figure 3:
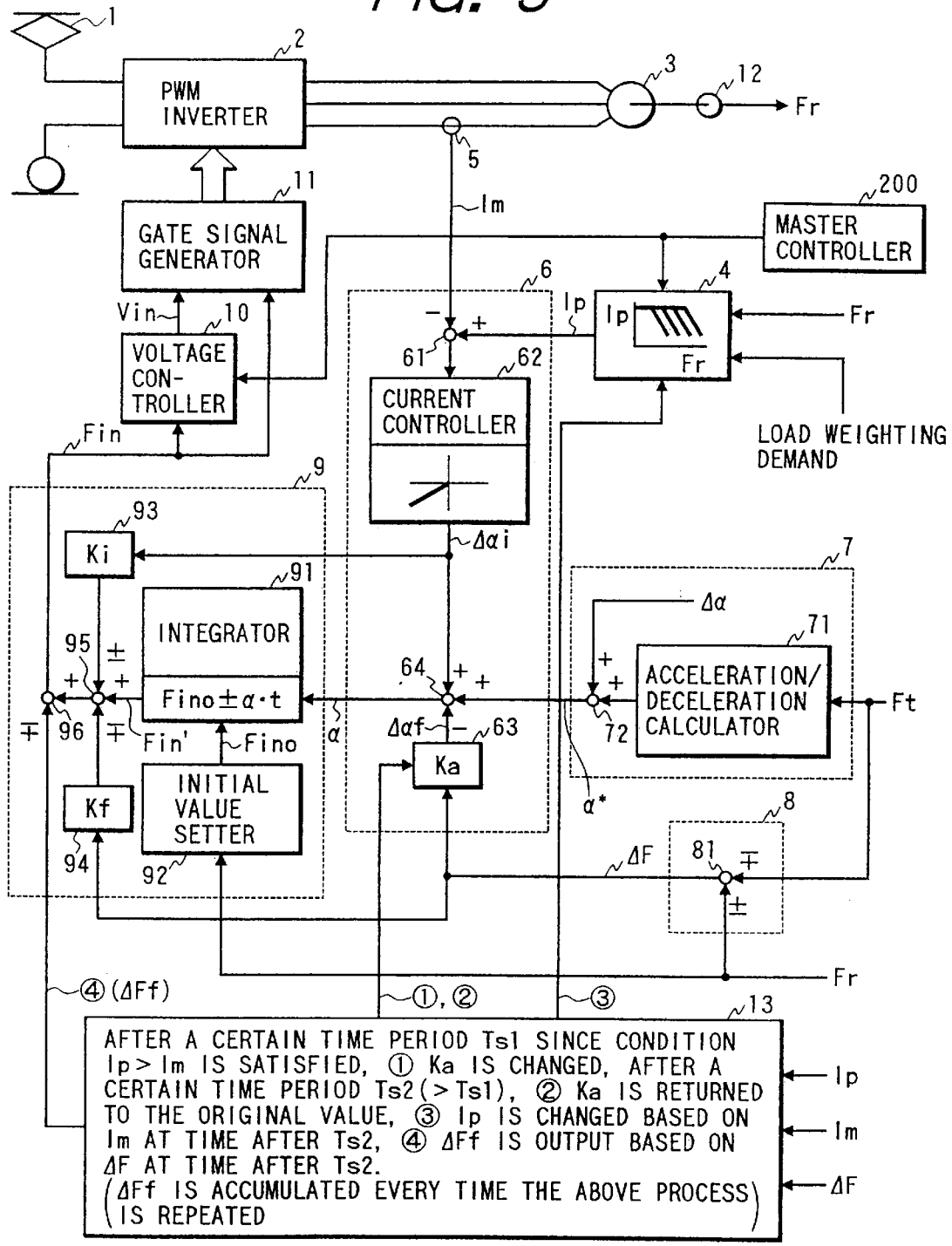
FIG. 3 is a block diagram showing the circuit construction of a second embodiment in accordance with the present invention.

FIG. 3 is a block diagram showing the circuit construction of a second embodiment in accordance with the present invention. The differences between the second embodiment and the first embodiment shown in FIG. 1 are in the inverter output frequency command generator 9 and the readhesion means 13.

That is, the inverter output frequency command generator 9 is additionally provided with multipliers 93, 94 and adding/subtracting devices 95, 96 to adjust the inverter output frequency command Fin using an output $\Delta\alpha i$ of the current controller 62, an output $\Delta F$ of the slip/skid quantity detector 8 and an output $\Delta Ff$ (constant) of the readhesion means 13.

The readhesion means 13 (1) changes the multiplying factor Ka of the multiplier 63 of the frequency-to-time rate-of-change command generator 6 at a certain time after Ts1 from the time when slip/skid occurs, that is, when the condition of the current command Ip>the inverter output current Im is satisfied, and (2) the changed value Ka is returned to its original value at a given time Ts2 (>Ts1).

In addition, (3) the current command Ip is changed based on the inverter output current Im after Ts2, as described above, and (4) outputs a constant value of a frequency adjusting amount of $\Delta Ff$ based on the output $\Delta F$ after ts2 of the slip-skid quantity detector 8. The above operation will be described below.

In the inverter output frequency command generator 9 in the second embodiment seen in FIG. 3, the output $\Delta\alpha i$ of the current controller 62 is multiplied by Ki times using a multiplier 93, and the result is added to or subtracted from an output Fin' of the integration calculator 91 using an adding/subtracting device 95 (adding at power running, and subtracting at regenerative running) to adjust the inverter output frequency command Fin.

By doing so, when the inverter output current Im is about to exceed the current command Ip, the control response capability for the inverter output current Im can be improved.

In the inverter output frequency command generator 9, the output $\Delta F$ of the slip/skid quantity detector 8 is multiplied by Kf times using a multiplier 94, and the result is added to or subtracted from an output Fin' of the integration calculator 91 using an adding/subtracting device 95 (subtracting at power running and adding at regenerative running) to adjust the inverter output frequency command Fin. By doing so, when the induction motor 3 is brought to a slip/skid state, the control response capability for the slip/skid can be improved.

A large value is preferable for the multiplying factor Ka of the multiplier 63 of the frequency-to-time rate-of-change command generator 6, as described above. However, when it is too large, in a case where an error occurs in the output $\Delta F$ of the slip/skid quantity detector 8 during normal running in which there is no slip/skid, the $\Delta\alpha f$ for Ka times $\Delta F$ may become larger than the given value $\Delta\alpha$ which is to be added to a frequency-to-time rate-of-change equivalent to an acceleration/deceleration of the vehicle.

As a result, a condition wherein the frequency-to-time rate-of-change command $\alpha$<the frequency-to-time rate-of-change equivalent to the acceleration/deceleration of the vehicle (the inverter output current Im<the current command Ip) occurs, and consequently the required acceleration/deceleration cannot be obtained.

Therefore, the multiplying factor Ka of the multiplier 63 of the frequency-to-time rate-of-change command generator 6 is set to a rather small value during normal running in which there is no slip/skid, and the value Ka is changed to a larger value at a first given time after Ts1 from the time when the slip/skid occurs, that is, when the condition of the current command Ip>the inverter output current Im is satisfied, and the changed Ka is returned to its original value at a second given time Ts2 (>Ts1).

By doing so, during normal running in which the slip/skid does not occur, the effect of an error in the output $\Delta F$ of the slip/skid quantity detector 8 can be decreased.

In addition to this, it is preferable to provide a means for correcting a steady-state error in ΔF, as described above. The current command Ip at that time is also changed based on the inverter output current Im after Ts2, as described above.

Further, at the time after Ts2, a constant value of ΔFf at that time, based on the output ΔF at that time, of the quantity of slip/skid indicated by detector 8 is added to or subtracted from the output Fin' of the integrating device 91 (subtracting at power running, and adding at regenerative running) to adjust the inverter output frequency command Fin.

By doing so, the slip frequency is converged corresponding to ΔF and readhesion is certainly obtained. Therein, ΔFf is accumulated every time a slip/skid and readhesion are repeated.

As stated above, according to the second embodiment seen in FIG. 3, in addition to the effects of the first embodiment shown in FIG. 1 as stated above, the control response capability of the inverter output current Im and the control response capability of the slip/skid can be improved.

Further, the effect of an error in the output ΔF of the quantity of slip/skid indicated by detector 8 can be decreased, and accordingly readhesion is certainly obtained.

Figure 4:
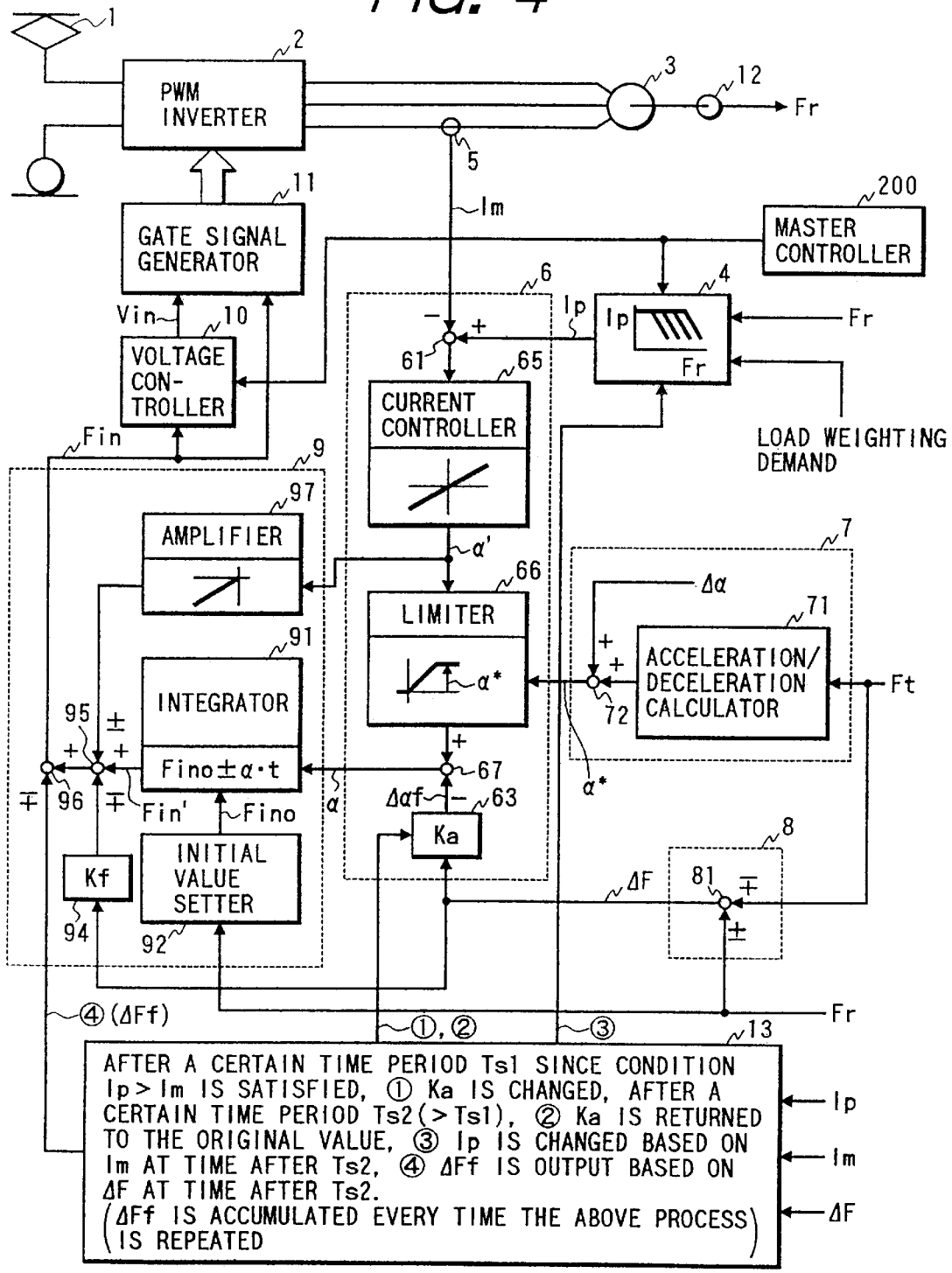
FIG. 4 is a block diagram showing the circuit construction of a third embodiment in accordance with the present invention.

FIG. 4 is a block diagram showing the circuit construction of a third embodiment in accordance with the present invention. The differences between the third embodiment and the second embodiment shown in FIG. 3 are in the frequency-to-time rate-of-change generating means 6 and the inverter output frequency command generator 9.

That is, in the frequency-to-time rate-of-change command generator 6, the inverter output current Im is subtracted from the current command Ip using the subtracter 61 and the current controller 65 outputs a frequency-to-time rate-of-change command α' corresponding to the difference.

The upper limit of α' is set to a reference frequency-to-time rate-of-change command α* by a limiter 66. The value of α' is subtracted from Δαf corresponding to the amount of the slip/skid ΔF using the subtracter 67 to output a frequency-to-time rate-of-change command α.

Then, in the inverter output frequency command generator 9, by replacing the multiplier 93 of FIG. 3 with an amplifier 97, the output Fin' of the integrator 91 is adjusted when the output α' of the current controller 65 becomes negative (the current command Ip<the inverter output current Im), as described above.

In the circuit having the construction described above, the frequency-to-time rate-of-change command α is controlled so that the inverter output current Im becomes equal to the current command Ip during a normal running in which there is no slip/skid.

Further, under a normal condition where the slip/skid occurs, when the inverter output current Im becomes smaller than the current command Ip, the output α' of the current controller 65 becomes equal to the reference frequency-to-time rate-of-change command α*, and α* is adjusted by Δαf corresponding to the quantity of slip/skid ΔF. That is, this is basically the same operation as that of the embodiment shown in FIG. 3.

Therefore, according to the embodiment of FIG. 4, the same effects as described above with reference to the embodiment of FIG. 3 can be attained.

Figure 5:
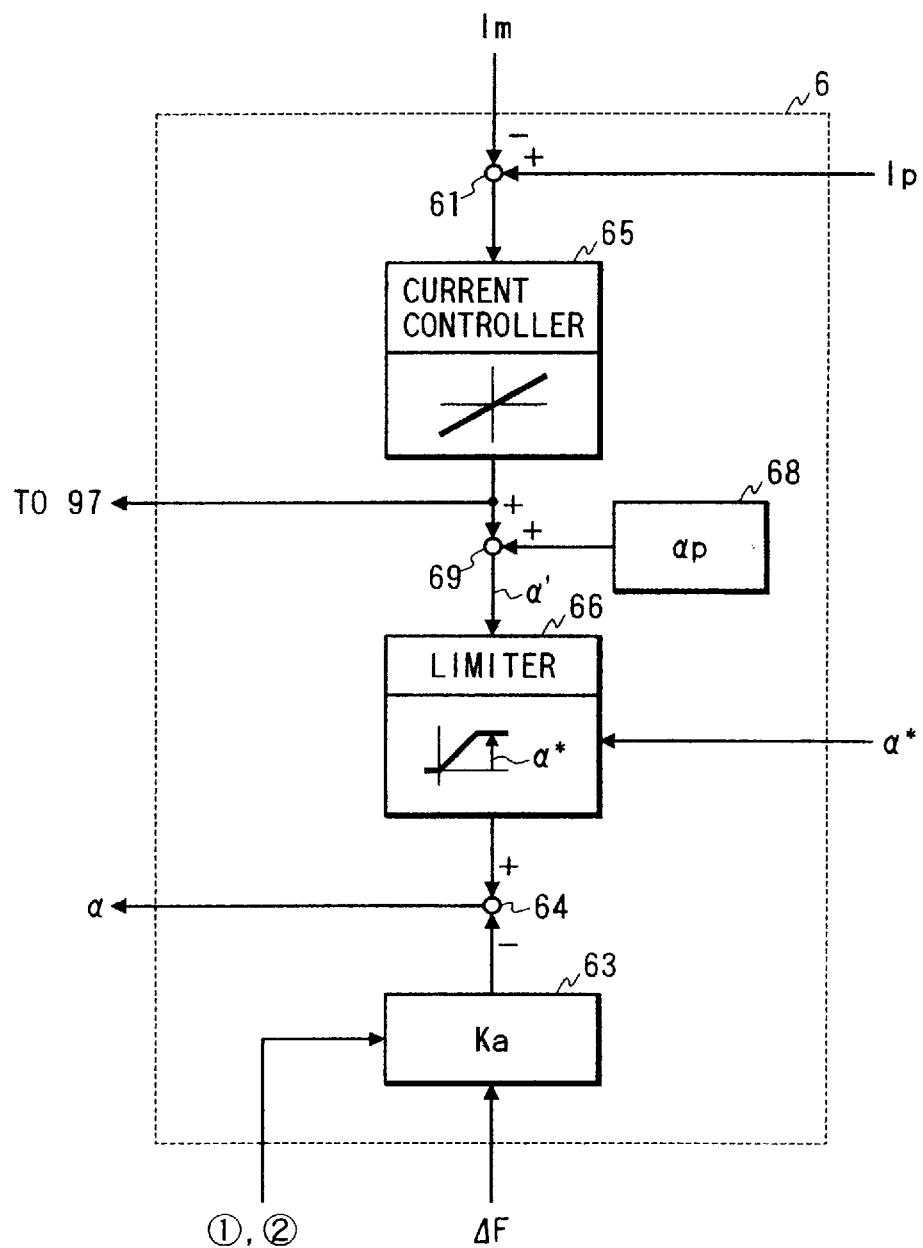
FIG. 5 is a block diagram showing another construction of the frequency-to-time rate-of-change generator 6 of FIG. 4.

Of course, the same effect can be attained by constructing the frequency-to-time rate-of-change generator so that it is provided with a means 68, as seen in FIG. 5, for generating a proper frequency-to-time rate-of-change command αp, which command αp is added to an output of the current controller 65 corresponding to the difference between the current command Ip and the inverter output current Im using an adder 69 to generate a frequency-to-time rate-of-change command α'.

In the embodiments of FIG. 1, FIG. 3 and FIG. 4, the means 7 for generating a reference frequency-to-time rate-of-change command α*, which is larger than the frequency-to-time rate-of-change equivalent to the acceleration/deceleration of the vehicle, has a construction in which a frequency-to-time rate-of-change equivalent to the acceleration/deceleration of the vehicle is calculated from a rotational frequency Ft of a non-driving wheel of a trailer, with the result then being added to a given value Δα. However, the means 7 also may be constructed as follows.

(1) . . . Taking an example of an electric car as the vehicle, the electric car is generally driven by four induction motors 31 to 34, as shown in FIGS. 6A, 6B and 6C. FIG. 6A shows a case where one inverter 21 (22, 23, 24) controls one induction motor 31 (32, 33, 34). FIG. 6B shows a case where one inverter 21 (22) controls two induction motors 31, 32 (33, 34). FIG. 6C shows a case where one inverter 21 controls four induction motors 31 to 34. Incidentally, the embodiments of FIG. 1, FIG. 3 and FIG. 4 relate to the case of FIG. 6A where one inverter controls one induction motor.

Therein, the rotational frequencies Fr1 to Fr4 of the induction motors 31 to 34 are detected by detectors 121 to 124, and each of the frequency-to-time rate-of-changes equivalent to acceleration/deceleration of the vehicle is calculated from each of the detected rotational frequencies.

Then, one value is selected among the calculated frequency-to-time rate-of-changes or an average value is calculated from them, and the result is added to the given value Δα to generate the reference frequency-to-time rate-of-change command α*.

Figure 7:
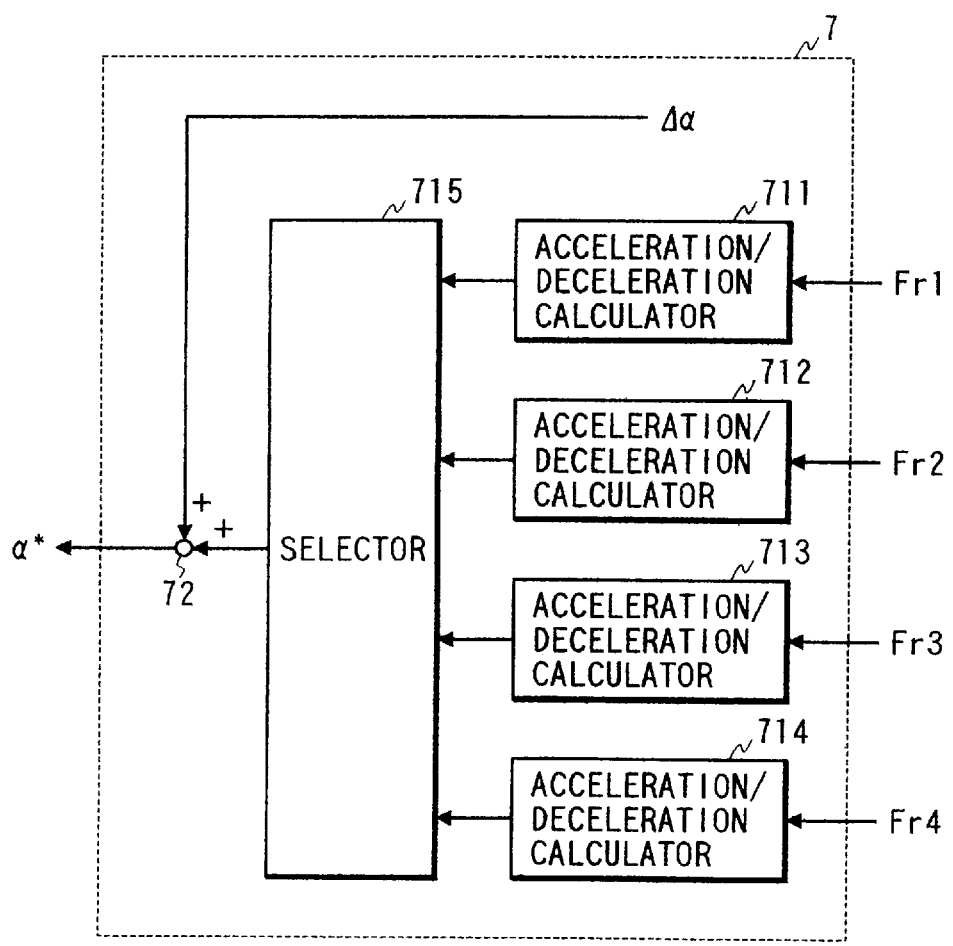
FIG. 7 is a block diagram showing another construction of the reference frequency-to-time rate of-change generator 7 in FIG. 1, FIG. 3 and FIG. 4.

One example is shown in FIG. 7. In FIG. 7, frequency-to-time rate-of-changes are calculated from rotational frequencies Fr1 to Fr4 of the induction motors 31 to 34 using acceleration/deceleration calculators 711 to 714.

The minimum value among them is selected when the vehicle is powered-running (when the minimum value detects vibration due to the rail joints, the second minimum value is selected) and the maximum value among them is selected when the vehicle is regenerative-running (when the maximum value detects vibration due to the rail joints, the second maximum value is selected), and then the given value Δα is added to the result using an adder 72 to output a reference frequency-to-time rate-of-change command α*.

Although not shown in the drawing, it is also possible that the maximum value and the minimum value among the four frequency-to-time rate-of-changes of the induction motors 31 to 34 are eliminated and the remainder are averaged and the given value Δα is added to the averaged value.

Since an electric train is generally driven with a plurality of driving cars, a reference frequency-to-time rate-of-change command α* may be generated based on the frequency-to-time rate-of-changes of the induction motors of the driving cars, in the same manner as described above.

(2) . . . A control system (not shown) may be constructed such that a frequency-to-time rate-of-change equivalent to the acceleration/deceleration of the vehicle is estimated from the current command Ip or the inverter output current (motor current) Im, and a reference frequency-to-time rate-of-change command α*, which is larger than the frequency-to-time rate-of-change equivalent to the acceleration/deceleration of the vehicle, is generated based on the estimated frequency-to-time rate-of-change.

In this case, the magnitude of the difference between the frequency-to-time rate-of-change equivalent to the acceleration/deceleration of the vehicle and $\alpha^*$ can be estimated from the output $\Delta\alpha i$ of the current controller 62 in the case of the embodiments of FIG. 1 and FIG. 3 and from the difference between the output $\alpha'$ of the current controller 65 and $\alpha^*$ in the case of the embodiment of FIG. 4.

Therefore, in considering that the frequency-to-time rate-of-change equivalent to the acceleration/deceleration of the vehicle changes depending on the load, which is subject to the boarding rate and/or the inclination, it is preferable that a means for changing $\alpha^*$, which means periodically checks $\Delta\alpha^*$ or the difference between $\alpha'$ and $\alpha^*$ and changes $\alpha^*$ when $\Delta\alpha^*$, or the difference between it and $\alpha'$, is unnecessarily large or small.

The above can be employed in the embodiments of FIG. 1, FIG. 3 and FIG. 4 when one inverter controls a plurality of induction motors, as shown in FIG. 6B and FIG. 6C.

In the embodiments of FIG. 1, FIG. 3 and FIG. 4, although the means 8 for detecting the quantity of the slip/skid $\Delta F$ is constructed so as to detect the difference between the rotational frequency of the driving wheel Fr and the rotational frequency of a non-driving wheel Ft, it also may be constructed as follows.

Figure 8A:
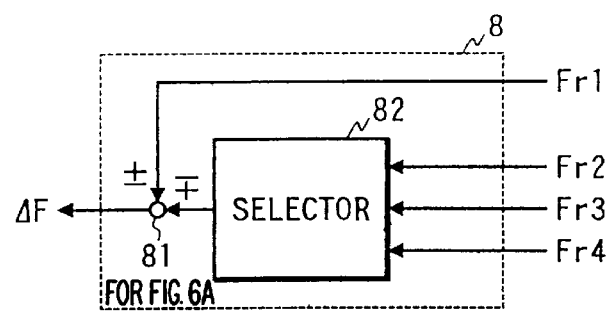
FIG. 8A is a block diagram showing one construction of the slip/skid quantity detector.

(1) ... In a case where one inverter controls one induction motor as shown in FIG. 6A, the means 8 for detecting the quantity of slip/skid $\Delta F$ is constructed as shown in FIG. 8A. That is, the rotational frequency difference $\Delta F$ is detected from a rotational frequency Fr1 of the induction motor 31 controlled by the inverter 21 and one value selected from rotational frequencies Fr2 to Fr4 of the induction motors 22 to 24 controlled by the other inverters 22 to 24 using a selector 82.

For example, when the vehicle is powered-running, the rotational frequency difference $\Delta F$ is detected by subtracting the minimum value Frpo among them (when the minimum value detects vibration due to the rail joints, the second minimum value is selected) from Fr1 using a subtracter 81.

And when the vehicle is regenerative-running, the rotational frequency difference $\Delta F$ is detected by subtracting Fr1 from the maximum value Frgo among them (when the maximum value detects vibration due to the rail joints, the second maximum value is selected) using the subtracter 81.

(2) ... In a case where one inverter controls two induction motors, as shown in FIG. 6B, the means 8 for detecting the quantity of slip/skid $\Delta F$ is constructed as shown in FIG. 8B-1 or FIG. 8B-2.

Figures 1, 8B:
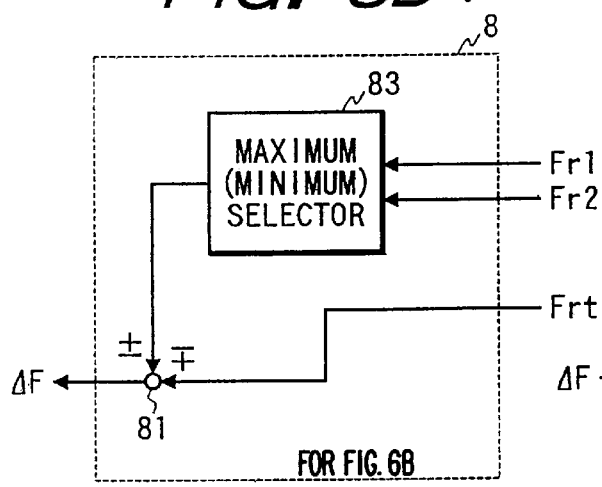

That is, as shown in FIG. 8B-1, a larger value Frm, when the vehicle is powered-running, or a smaller value Frs, when the vehicle is regenerative-running, between the rotational frequencies Fr1 and Fr2 of the induction motors 31 and 32 controlled by the inverter 21, is selected using a selector 83.

And a rotational frequency difference $\Delta F$ between the selected value and the rotational frequency of the non-driving wheel is detected by subtracting Ft from Frm using the subtracter 81 when the vehicle is powered-running or by subtracting Frs from Ft using the subtracter 81 when the vehicle is regenerative-running.

Figures 2, 8B:
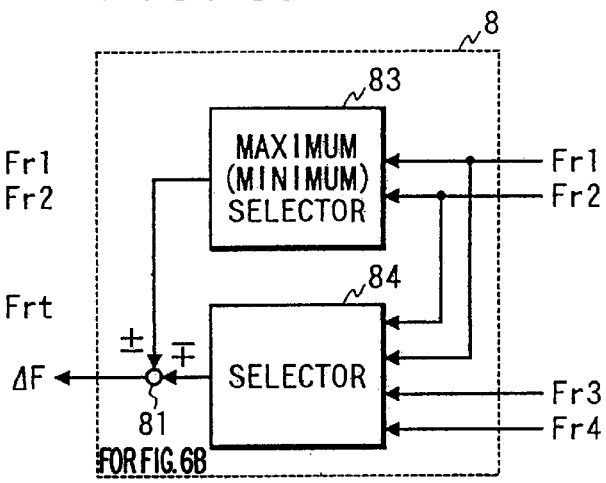

Otherwise, as shown in FIG. 8B-2, a rotational frequency difference $\Delta F$ is detected from the larger value Frm, when the vehicle is powered-running, or the smaller value Frs, when the vehicle is regenerative-running, as selected from the rotational frequencies Fr1 and Fr2 of the induction motors 31 and 32 controlled by the inverter 21 using a selector 83, and one selected value from the rotational frequencies Fr3 and Fr4 of the induction motors 23 and 24, controlled by the other inverter 22, and Fr1 and Fr2 using a selector 84.

For example, when the vehicle is powered-running, the rotational frequency difference $\Delta F$ is detected by subtracting the minimum value Frpo among them (when the minimum value detects vibration due to the rail joints, the second minimum value is selected) from Frgo using a subtracter 81.

And when the vehicle is regenerative-running, the rotational frequency difference $\Delta F$ is detected by subtracting Frs from the maximum value Frgo among them (when the maximum value detects vibration due to the rail joints, the second maximum value is selected) using the subtracter 81.

(3) ... In a case where one inverter controls four induction motors, as shown in FIG. 6C, the means 8 for detecting the quantity of slip/skid $\Delta F$ is constructed as shown in FIG. 8C-1 or FIG. 8C-2.

Figures 1, 8C:
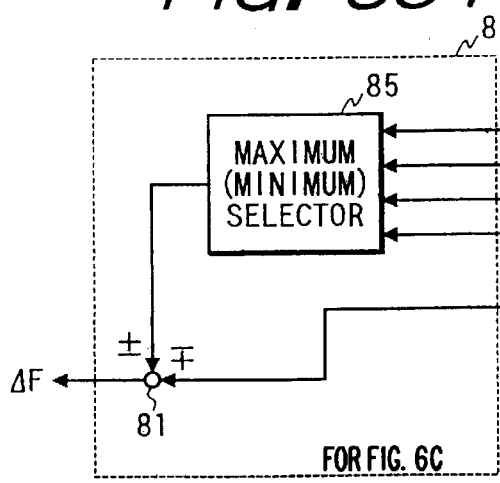
Figures 2, 8C:
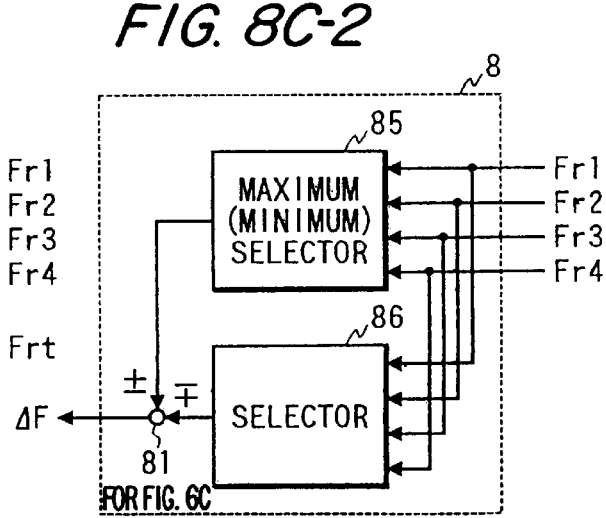

That is, as shown in of FIG. 8C-1, the maximum value Frmax, when the vehicle is powered-running, or the minimum value Frmin, when the vehicle is regenerative-running, among the rotational frequencies Fr1 to Fr4 of the induction motors 31 to 34 controlled by the inverter 2 is selected using a selector 85.

And, the rotational frequency difference $\Delta F$ between the selected value and the rotational frequency of the non-driving wheel is detected by subtracting Ft from Frmax using the subtracter 81, when the vehicle is powered-running, or by subtracting Frmin from Ft using the subtracter 81, when the vehicle is regenerative-running.

Otherwise, as shown in FIG. 8C-2, the rotational frequency difference $\Delta F$ is detected from the maximum value Frmax, when the vehicle is powered-running, or the minimum value Frmin, when the vehicle is regenerative-running, as selected from rotational frequencies Fr1 to Fr4 of the induction motors 31 to 34 controlled by the inverter 2, using a selector 85 and a selected one of the rotational frequencies Fr1 to Fr4, using the selector 86.

For example, when the vehicle is powered-running, the rotational frequency difference $\Delta F$ is detected by subtracting the minimum value Frpo among them (when the minimum value detects vibration due to the rail joints, the second minimum value is selected) from Frmax using the subtracter 81.

And, when the vehicle is regenerative-running, the rotational frequency difference $\Delta F$ is detected by subtracting Frmin from the maximum value Frgo among them (when the maximum value detects vibration due to the rail joints, the second maximum value is selected) using the subtracter 81.

Since an electric train (railway electric rolling stock) is generally driven with a plurality of driving vehicles, the quantity of the slip/skid may be detected from the rotational frequencies of the induction motors of these driving cars in the same manner as described in items (1) to (3) above.

Examples of simulation results will be described below.

Figure 10:
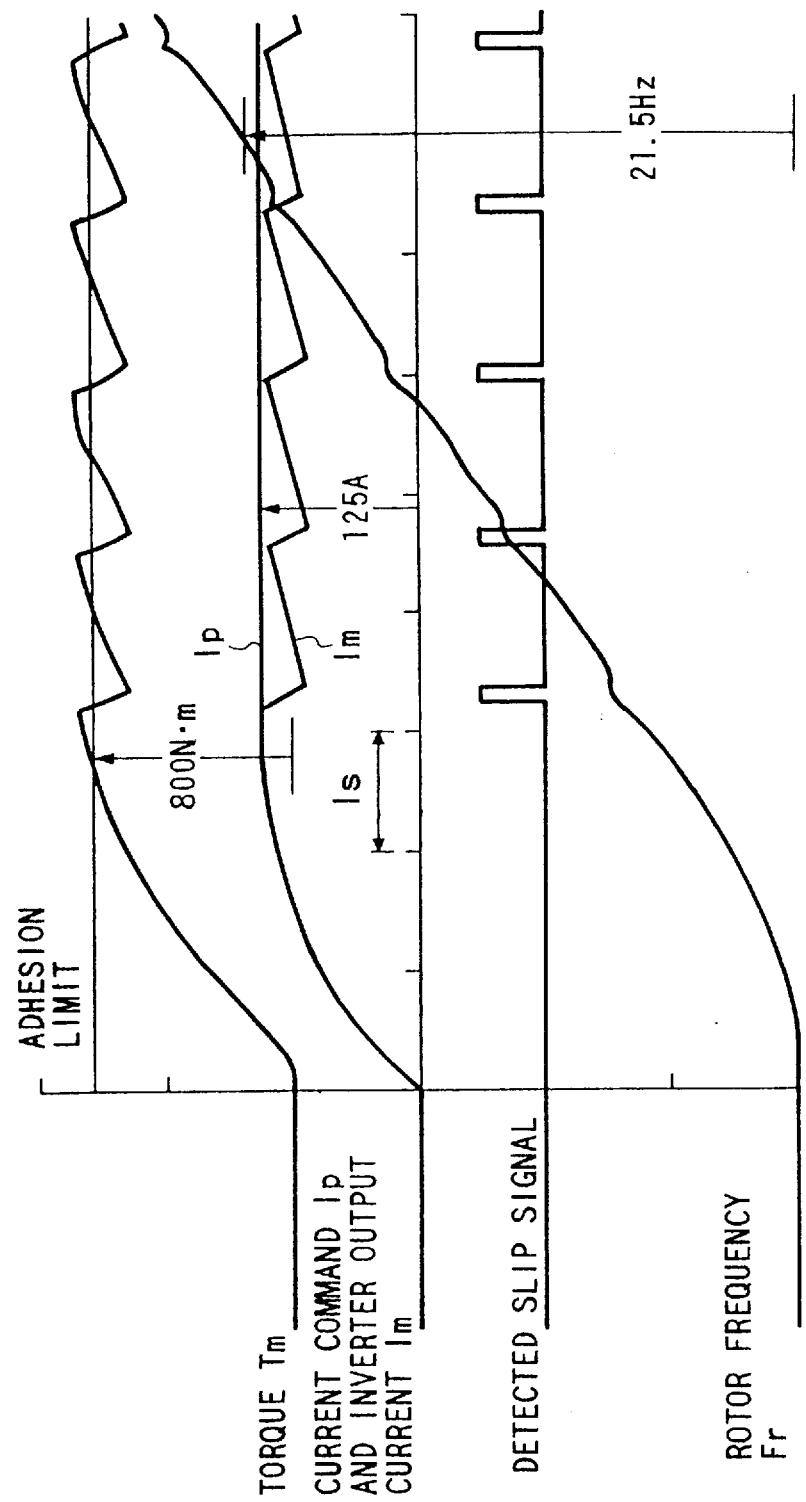
FIG. 10 is a graph showing an example of a simulation result of a conventional method.

FIG. 9 and FIG. 10 show examples of simulation conducted under conditions where the induction motor 3 is slipping. FIG. 9 shows a case of readhesion control carried out by the embodiment of FIG. 3, and FIG. 10 shows a case of conventional readhesion control in which slip frequency is controlled according to a constant pattern when slip is detected (when slip is detected, the slip frequency is reduced at a constant speed, and when readhesion is attained, the slip frequency is slowly recovered at a constant speed).

It can be understood from FIG. 9 that according to the embodiment of FIG. 3, the torque Tm of the induction motor 3 is controlled according to the current command Ip until the torque Tm reaches the adhesion limit. It can be understood from FIG. 9 and FIG. 10 that according to the embodiment of FIG. 3 (FIG. 9), the frequency of slipping is decreased and the torque Tm is increased up to the adhesion limit compared to the conventional method (FIG. 10).

Figure 11:
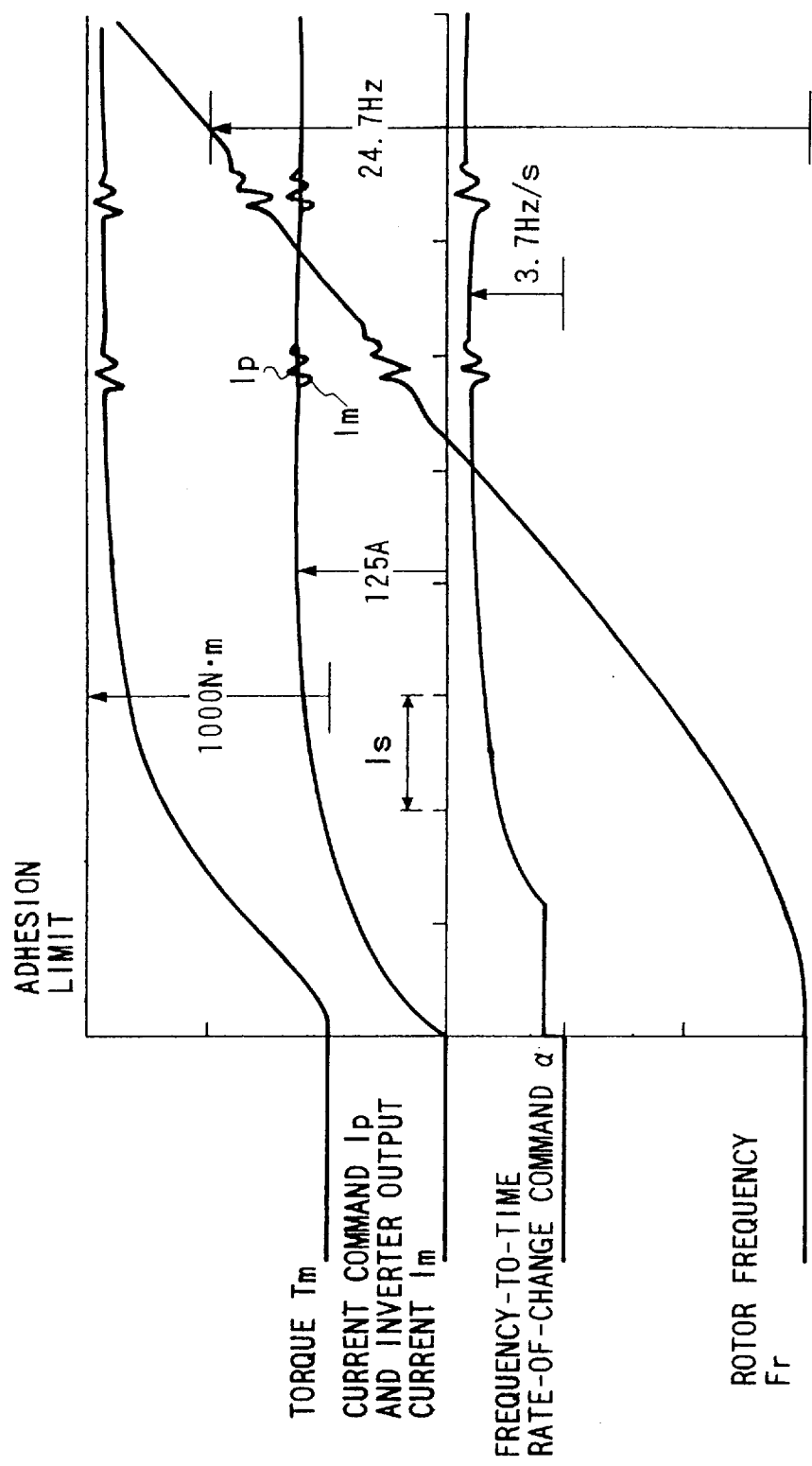
FIG. 11 is a graph showing an example of a simulation result of the slip error detection of FIG. 3.
Figure 12:
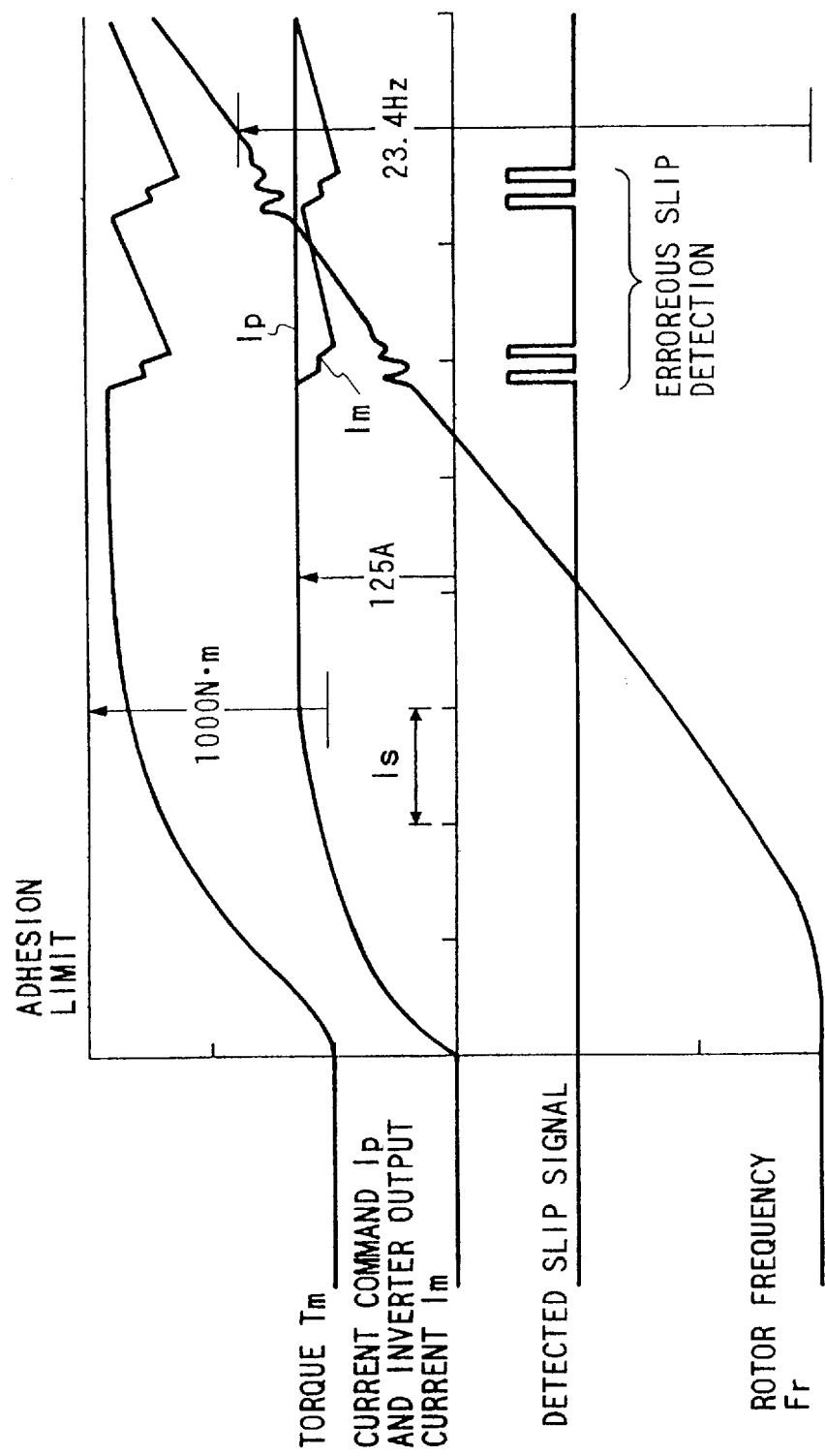
FIG. 12 is a graph showing an example of a simulation result of the slip error detection of a conventional method.

FIG. 11 and FIG. 12 show examples of simulation under conditions where the rotational frequency Fr of the induction motor 3 is oscillatory so that slipping is erroneously detected.

FIG. 11 shows a case of readhesion control by the embodiment of FIG. 3, and FIG. 12 shows a case of conventional readhesion control in which the slip frequency is controlled according to a constant pattern when slip is detected (when the slip is detected, the slip frequency is reduced at a constant speed, and when readhesion is attained, the slip frequency is slowly recovered at a constant speed).

It can be understood from FIG. 11 and FIG. 12 that when slip is erroneously detected, the torque Tm of the induction motor 3 in the embodiment of FIG. 3 (FIG. 11) slightly changes, but the torque Tm in the conventional method (FIG. 12) largely decreases.

Therefore, in the conventional readhesion control method, the detecting level for the slip must be set higher, and consequently the slip is increased to a larger extent than that shown in FIG. 10 and the torque Tm is largely decreased and the acceleration characteristic is degraded.

In the aforementioned embodiments, the current has been described as a manipulated variable for controlling the torque. However, in control where a manipulated variable for controlling the torque is a torque command or a torque current command, such as, for example, vector control of an alternating current motor, the same effect can be attained when the present invention is applied to such a command. This is within the scope of the present invention.

According to the present invention, since the output frequency command of the inverter is generated based on a frequency-to-time rate-of-change command, the detection of the rotational frequency of the induction motor is basically unnecessary for generating the output frequency command of the inverter.

Further, since the frequency-to-time rate-of-change command is controlled so that the output current of the inverter agrees with the current command during normal running where a slip/skid does not occur, there is an effect in that over-current hardly occurs and the vehicle is accelerated/decelerated with a torque equivalent to the current command.

Further, under a condition where a slip/skid occurs, the frequency-to-time rate-of-change command is adjusted corresponding to the quantity of the slip/skid, and consequently the slip/skid is suppressed.

Then, after a certain time period in which the slip/skid occurs and the condition of the slip/skid reaches a value near the adhesion limit between the wheel and the rail, the current command is changed based on the output current of the inverter.

Therefore, there is an effect in that the slip/skid is settled, that is, readhesion occurs and the vehicle is accelerated/decelerated with a torque equivalent to a value near the adhesion limit.

I claim:

1. A control system for an electric vehicle comprising:
   at least one induction motor for driving an electric vehicle;
   an inverter for driving said induction motor;
   means for generating a current command for controlling a current output from said inverter;
   means for detecting an output current of said inverter;
   means for generating a reference frequency-to-time rate-of-change command corresponding to an acceleration/deceleration of said vehicle and being larger than a time-to-change rate of an output frequency of said inverter;
   means for detecting a quantity of slip/skid of a driving wheel driven by said induction motor;
   means for generating a frequency-to-time rate-of-change command by adjusting said reference frequency-to-time rate-of-change command corresponding to a difference between said detected value of said output current and said current command and said detected value of said quantity of slip/skid when said detected value of said output current is larger than said current command;
   means for generating an output frequency command for controlling said inverter based on said frequency-to-time rate-of-change command; and
   readhesion means for changing said current command based on said detected value of said output current when a time period of a state where said detected value of said output current is smaller than said current command exceeds a given time period.

2. A control system for an electric vehicle comprising:
   at least one induction motor for driving an electric vehicle;
   an inverter for driving said induction motor;
   means for generating a current command for controlling a current output from said inverter;
   means for detecting an output current of said inverter;
   means for generating a reference frequency-to-time rate-of-change command corresponding to an acceleration/deceleration of said vehicle and being larger than a time-to-change rate of an output frequency of said inverter;
   means for detecting a quantity of slip/skid of a driving wheel driven by said induction motor;
   means for generating a first frequency-to-time rate-of-change command limited so as to not exceed said reference frequency-to-time rate-of-change command based on a difference between said current command and said detected value of said output current;
   means for generating a second frequency-to-time rate-of-change command by adjusting said first frequency-to-time rate-of-change command corresponding to said detected value of said quantity of slip/skid;
   means for generating an output frequency command for controlling said inverter based on said second frequency-to-time rate-of-change command; and
   readhesion means for changing said current command based on the detected value of said output current when the time period of a state where said detected value of said output current is smaller than said current command exceeds a given time period.

3. A control system for an electric vehicle according to any one of claim 1 and claim 2,
   further comprising means for adjusting said output frequency command corresponding to said difference between said detected value of said output current and said current command when said detected value of said output current exceeds said current command.

4. A control system for an electric vehicle according to any one of claim 1 and claim 2, wherein the control system further comprises means for adjusting said output frequency command corresponding to said detected value of said quantity of slip/skid.

5. A control system for an electric vehicle according to any one of claim 1 and claim 2, wherein said readhesion means comprises means for changing said output frequency command by a certain amount based on a detected value of a quantity of slip/skid when said current command is changed.

6. A control system for an electric vehicle according to claim 1, wherein said readhesion means comprises means for changing a gain for adjusting said reference frequency-to-time rate-of-change command corresponding to a detected value of a quantity of slip/skid before changing said current command and for returning said changed gain to the value of the gain before its chance when said current command is changed.

7. A control system for an electric vehicle according to claim 2, wherein said readhesion means comprises means for changing the gain for adjusting said first frequency-to-time rate-of-change command corresponding to a detected value of a quantity of slip/skid before changing said current command and for returning said changed gain to the value of said gain before its change when said current command is changed.

8. A control system for an electric vehicle according to any one of claim 1 and claim 2, wherein said readhesion means comprises means for gently returning a changed current command to the value of said current command before its change when a time period of a state where said detected value of said output current is larger than said current command before its change exceeds a given time period.

9. A control system for an electric vehicle according to any one of claim 1 and claim 2, wherein said reference frequency-to-time rate-of-change command is determined based on a time-to-change rate of a rotating speed of a non-driving wheel of said vehicle.

10. A control system for an electric vehicle according to any one of claim 1 and claim 2, wherein said reference frequency-to-time rate-of-change command is determined based on a time-to-change rate of rotating frequencies of a plurality of induction motors for driving said vehicle other than said induction motor.

11. A control system for an electric vehicle according to any one of claim 1 and claim 2, wherein said reference frequency-to-time rate-of-change command is determined from said current command.

12. A control system for an electric vehicle according to any one of claim 1 and claim 2, wherein said means for detecting a quantity of slip/skid detects a quantity of slip/skid by comparing a rotational frequency of said induction motor with a rotational frequency of a non-driving wheel of said vehicle, when there is only one induction motor, and by comparing a value selected from rotating frequencies of plural induction motors with a rotational frequency of said non-driving wheel of said vehicle when there are plural induction motors.

13. A control system for an electric vehicle according to any one of claim 1 and claim 2, wherein said means for detecting a quantity of slip/skid detects a quantity of slip/skid by comparing a rotational frequency of said induction motor with a value selected from rotating frequencies of other induction motors, when there is one induction motor, and by comparing a value selected from rotating frequencies of plural induction motors with a value selected from rotating frequencies of the plural induction motors for driving said vehicle, other than said other induction motors, when there are plural induction motors for driving said vehicle.

* * * * *